Oct. 30, 1951  G. GIBSON  2,573,431
FISHING TACKLE CONTAINER
Filed Oct. 11, 1946  2 SHEETS—SHEET 2
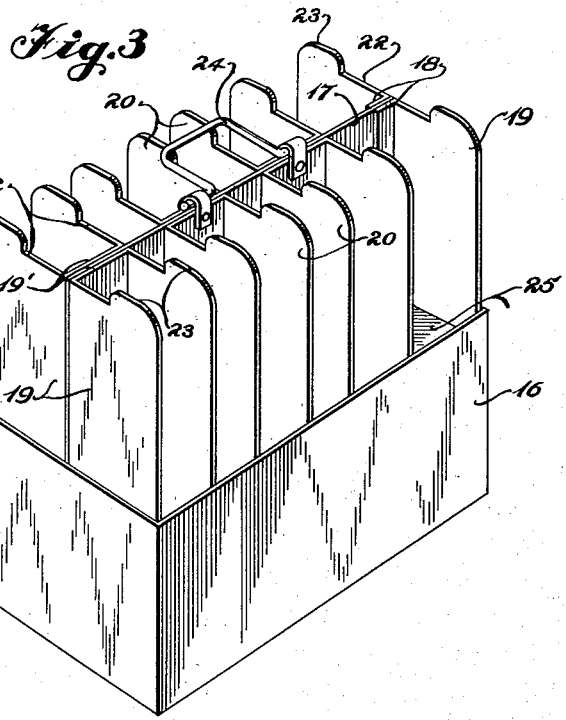
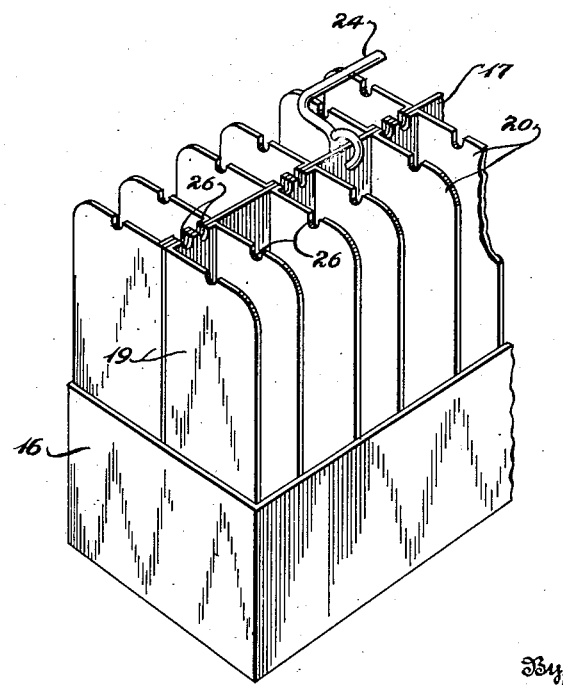
Inventor
Glenn Gibson Patented Oct. 30, 1951

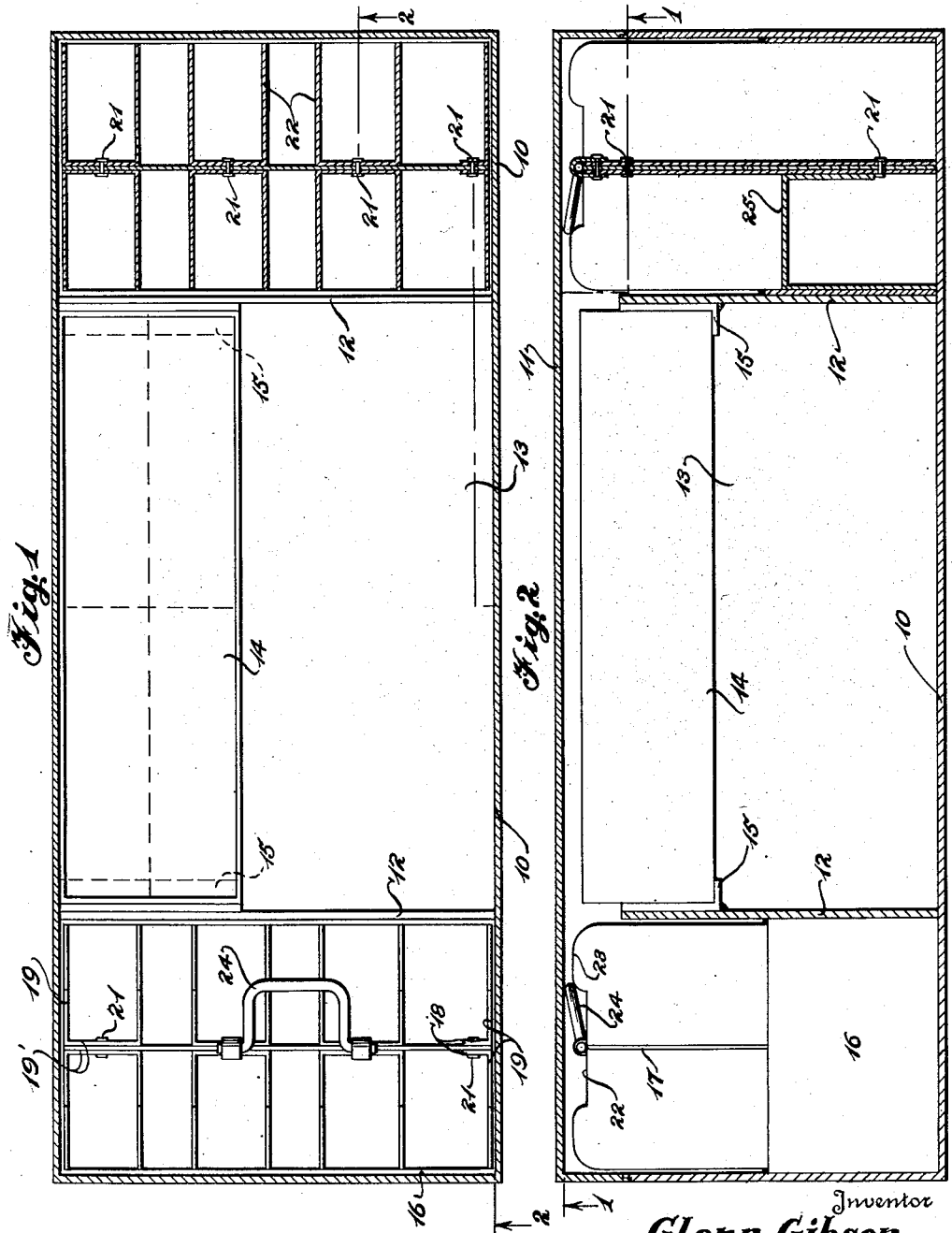

2,573,431

UNITED STATES PATENT OFFICE 2,573,431

FISHING TACKLE CONTAINER

Glenn Gibson, Southern Pines, N. C.

Application October 11, 1946, Serial No. 702,642

4 Claims. (Cl. 43—54.5)

1

This invention has to do with containers for fishing tackle.

It has for its object to provide a container of such construction that the tackle may be hung therein and danger of entanglement or fouling of the hooks, plugs, or other baits avoided, and each individual bait selected by the user can be readily removed. The term "hooks" as used herein defines any type of hook, single or plural, and the term "baits" is used as meaning any type of lure.

Fishing tackle is developed in many different forms, and a great variety of baits or lures are provided. It is the custom of fishermen to carry a large number of hooks and baits to meet different conditions of water and weather, and also such as are suitable for the kinds of fish which are angled for. To satisfactorily handle such tackle, it is essential not only that it be compactly and securely stored so as to prevent entanglement, but also that it be exposed to view to permit the ready selection of any desired hook or bait without the necessity of removing it from its storage space for examination to determine its fitness for the particular conditions under which it is to be used. It is with a view of meeting such needs that the present invention has been developed.

In the drawings herewith is illustrated one physical embodiment of the invention.

In said drawings,

Figure 1 is a view in plan of a box in which the tackle container may be carried, this view being substantially on the line 1—1 of Figure 2.

Figure 2 is a longitudinal sectional view on substantially the line 2—2 of Figure 1.

Figure 3 is a perspective view of the container.

Figure 4 is a perspective view of a portion of the container showing a slightly modified form.

Briefly stated, the invention comprises a removable bait container adapted to be carried in any suitable type of box and having an open top and bottom and means for suspending the hooks and baits. The lower part of the sides and ends of the container is boxed-in or closed, so that individual baits hung in the compartments will be maintained always in properly separated suspended condition and escape from the compartments or entanglement with adjacent baits will be avoided. This result is accomplished by reason of the novel construction which will be described in detail, reference being had to the accompanying drawings illustrating one physical embodiment of the invention.

Referring to the drawings by numbers, the

2 same numbers indicating the same parts in the several views, 10 designates any suitable box in which the tackle container will be removably placed. The box 10, as here shown, is rectangular in form and has side and end panels, and a lid 11, which may be hinged or otherwise secured in place. The box may be provided with any number of compartments desired. As here shown, there are two end compartments 12 to receive tackle containers. The box 10 may have a central compartment 13 in which may be stored other commodities. Compartment 13 may be of sufficient size to carry packages of various types such as lunch, thermos bottles, raincoats, etc. At the upper part of the compartment 13 is preferably provided a tray 14 divided into compartments, which compartments may carry reels and other small supplies, the tray being removable and supported in any proper manner as by projecting ledges 15 on the inside of the compartment 13. This illustration and description of a box is to show one convenient form with which the tackle container may be used. The box here shown, is designed to hold two tackle containers, but it will be understood that various types of boxes, designed to hold one or more containers, and divided into compartments of various shapes and number, may be used.

The bait container is made up of a box-like lower portion 16, so as to form an open-bottomed portion, this lower portion 16 of the container having side and end walls. Within this box-like lower portion is a longitudinal partition 17 extending from one end of the container to the other, the partition 17 being preferably fastened at one end to flanges 18 extending from the end partitions 19 which rise vertically from the boxed-in lower portion 16 and constitute end wall continuations thereof. At the other end, partition 17 is engaged by inwardly turned flanges 18' on the end wall 19. The partition and flanges are secured together in any suitable manner, as for example, by rivets 21, although any other suitable manner of securing the parts together may be used. Between the end wall continuations 19 a plurality of transversely disposed partitions 20 are provided, which partitions 20 extend from the top of the longitudinal partition 17 down to the open bottom of the boxed-in lower portion 16 of the container, so as to provide a plurality of independent compartments. Preferably, the partitions 20 will be formed in pairs by bending a sheet of suitable dimensions to a substantially U-shape to provide two partitions. This U-shaped partition member may be secured to the longitudinal partition 17 in any suitable manner, as by rivets 21 passing through the middle portion of the U-shaped member.

In order to suspend the hooks and bait within the compartments and prevent their accidental displacement, the upper ends of the transverse partitions 20 will be recessed as at 22 across their middle portions, leaving projections 23 at the ends of the recesses 22 so as to retain the hooks within the recessed portions.

It should be noted that the end wall continuations 19 are of substantially the same height as the longitudinal partition 17 and that the transverse partitions 20 are of substantially the same height as the end walls 19 and the longitudinal partition.

It will be seen that as thus constructed, a container is provided in which the hooks and baits will each be suspended in separate compartments and prevented from escaping from those compartments and becoming entangled, by reason of the partitions 20 and the end and side walls of the lower box-like part 16 of the container.

Preferably, the container will be provided with a handle 24 hinged to the longitudinal partition 17 so that the container may be readily lifted from the compartment of the box in which it is carried, and it is not necessary to carry the box with its load of other equipment from place to place.

If desired, one of the compartments in the container may be provided with a bottom 25 formed of a strip, bent as shown in Fig. 2, to provide a bottom wall and serve as a holder for any desired article as, for example, an oil can which is frequently desirable in connection with such equipment.

Constructed in accordance with the invention herein disclosed, a tackle container is provided which will maintain the hooks and bait always in segregated positions, so that there is no danger of the tackle entangling or escaping after it is once hung in the container. At the same time, the open upper portion of the container permits ready inspection and selection of any desired hook and bait. The open bottom of the container permits escape of any water or foreign matter which may be picked up by the hook and bait.

It will be understood that the number of compartments may be varied to suit the needs of the user and that its mechanical make up may be varied without departing from the principle of the invention here disclosed.

In the form of the invention shown in Figure 4, the same general make up is disclosed, but the tops of the partitions may be provided with individual notches 26, as distinguished from the long recesses shown in Figure 1, these notches serving as supports for the hooks and baits and ensuring the same individual separation of the tackle as heretofore described.

Such changes from the specific construction here shown and described as involve only mechanical skill may be made without departing from the invention as defined in the appended claims.

I claim:

1. A rack for carrying fishing lures, comprising a lower, open-bottomed casing section including horizontally elongated, upright side walls and end walls, said casing having therein vertically elongated upright end walls of materially greater height than the side walls, a longitudinal partition positioned midway between the side walls of substantially the same height as said latter end walls and connected at its ends to the latter, and a plurality of transverse partitions secured to said longitudinal partition between the latter end walls and extending to the side walls, and being of substantially the same height as said latter end walls and projecting above the side walls a distance sufficient to expose to view a substantial portion of hook supported lures in the compartments formed by the partitions and said latter end walls, said transverse partitions and said latter end walls being notched inwardly of their outer edges to receive the hooks associated with said lures.

2. A rack for carrying fishing lures, comprising a lower, open-bottomed casing section including horizontally elongated, upright side walls and end walls, said casing having therein vertically elongated upright end walls of materially greater height than the side walls, a longitudinal partition positioned midway between the side walls of substantially the same height as said latter end walls and connected at its ends to the latter, and a plurality of transverse partitions secured to said longitudinal partition between the latter end walls and extending to the side walls, and being of substantially the same height as said latter end walls and projecting above the side walls a distance sufficient to expose to view a substantial portion of hook supported lures in the compartments formed by the partitions and said latter end walls, the upper edges of said transverse partitions having projections at their outer edge portions extending above their inner edge portions, thereby providing notches to receive the hooks of said lures.

3. A rack for carrying fishing lures, comprising a lower, open-bottomed casing section including horizontally elongated, upright side walls and end walls, said casing having therein vertically elongated upright end walls of materially greater height than the side walls, a longitudinal partition positioned midway between the side walls of substantially the same height as said latter end walls and connected at its ends to the latter, and a plurality of transverse partitions secured to said longitudinal partition between the latter end walls and extending to the side walls, and being of substantially the same height as said latter end walls and projecting above the side walls a distance sufficient to expose to view a substantial portion of hook supported lures in the compartments formed by the partitions and said latter end walls, said partitions defining vertically elongated pockets, opening outwardly and upwardly at their upper portions, the upper ends of the transverse partitions at their outer ends having projections extending upwardly above the inner portions thereof.

4. A rack for carrying fishing lures, comprising a lower, open-bottomed casing section including horizontally elongated, upright side walls and end walls, said casing having therein vertically elongated upright end walls of materially greater height than the side walls, a longitudinal partition positioned midway between the side walls of substantially the same height as said latter end walls and connected at its ends to the latter, and a plurality of transverse partitions secured to said longitudinal partition between the latter end walls and extending to the side walls, and being of substantially the same height as said latter end walls and projecting above the side walls a distance sufficient to expose to view a substantial portion of hook supported lures in the compartments formed by the partitions and said latter end walls, at least some of said transverse partitions being notched inwardly of their outer edges to receive the hooks associated with said lures, and a carrying handle pivotally connected to said longitudinal partition and arranged to swing downwardly to the elevation of the upper ends of said partitions when not in use.

GLENN GIBSON.

REFERENCES CITED

The following references are of record in the file of this patent:

UNITED STATES PATENTS

| Number | Name | Date |
|---|---|---|
| 378,911 | Willson | Mar. 6, 1888 |
| 395,939 | Adler | Jan. 8, 1889 |
| 513,044 | Handlan | Jan. 16, 1894 |
| 901,999 | Perry | Oct. 27, 1908 |
| 1,017,812 | Schemelzer | Feb. 20, 1912 |
| 1,038,644 | Phin | Sept. 17, 1912 |
| 1,261,861 | Sherman | Apr. 9, 1918 |
| 1,749,227 | Pruett | Mar. 4, 1930 |
| 1,997,243 | Vanderhider et al. | Apr. 3, 1935 |
| 2,013,240 | Harvey | Sept. 3, 1935 |
| 2,105,645 | Gemmill | Jan. 18, 1938 |
| 2,220,817 | Holmes | Nov. 5, 1940 |
| 2,279,897 | Ammon | Apr. 14, 1942 |

FOREIGN PATENTS

| Number | Country | Date |
|---|---|---|
| 422,431 | Great Britain | of 1935 |